United States Patent
Silverman et al.

(12)

(10) Patent No.: US 6,370,603 B1
(45) Date of Patent: Apr. 9, 2002

(54) CONFIGURABLE UNIVERSAL SERIAL BUS (USB) CONTROLLER IMPLEMENTED ON A SINGLE INTEGRATED CIRCUIT (IC) CHIP WITH MEDIA ACCESS CONTROL (MAC)

(75) Inventors: Joel Silverman, Mountain View; Michael D. Rostoker, Boulder Creek, both of CA (US)

(73) Assignee: Kawasaki Microelectronics, Inc., Chiba (JP)

( * ) Notice: Subject to any disclaimer, the term of this patent is extended or adjusted under 35 U.S.C. 154(b) by 0 days.

(21) Appl. No.: 09/166,501

(22) Filed: Oct. 5, 1998

Related U.S. Application Data

(60) Provisional application No. 60/070,097, filed on Dec. 31, 1997.

(51) Int. Cl.[7] .......................... G06F 13/14; G06F 13/38
(52) U.S. Cl. ........................ 710/72; 710/56; 710/62; 710/63; 710/126; 710/129; 709/220
(58) Field of Search ................ 710/56, 72, 62, 710/63, 126, 129; 709/220

(56) References Cited

U.S. PATENT DOCUMENTS

| | | | | |
|---|---|---|---|---|
| 5,544,326 A | * | 8/1996 | Pease et al. ............... 395/250 |
| 5,615,344 A | * | 3/1997 | Corder ....................... 395/309 |
| 5,684,954 A | * | 11/1997 | Kaiserswerth et al. ... 395/200.2 |
| 5,715,409 A | * | 2/1998 | Bucher et al. .............. 395/309 |
| 5,816,718 A | * | 10/1998 | Poole ........................... 400/88 |
| 6,185,641 B1 | * | 2/2001 | Dunnihoo ..................... 710/56 |

* cited by examiner

Primary Examiner—Thomas Lee
Assistant Examiner—Rehana Perveen
(74) Attorney, Agent, or Firm—Gerald E. Linden

(57) ABSTRACT

An interface device is provided which enables communications between devices having disparate protocols (e.g., USB and Ethernet), and can be fabricated on a single integrated circuit (IC) chip. A system incorporating the interface device provides plug-and-play capability for both MAC and non-MAC environments. A "smart" cable incorporating the interface device has the ability to recognize what type of external device using what type of protocol is connected to the "other" end of the cable, thereby enabling a host to communicate with the external device. An electronic component (e.g., integrated circuit) incorporating the technique is suitably included in a system or subsystem having electrical functionality, such as general purpose computers, telecommunications devices, and the like.

32 Claims, 7 Drawing Sheets

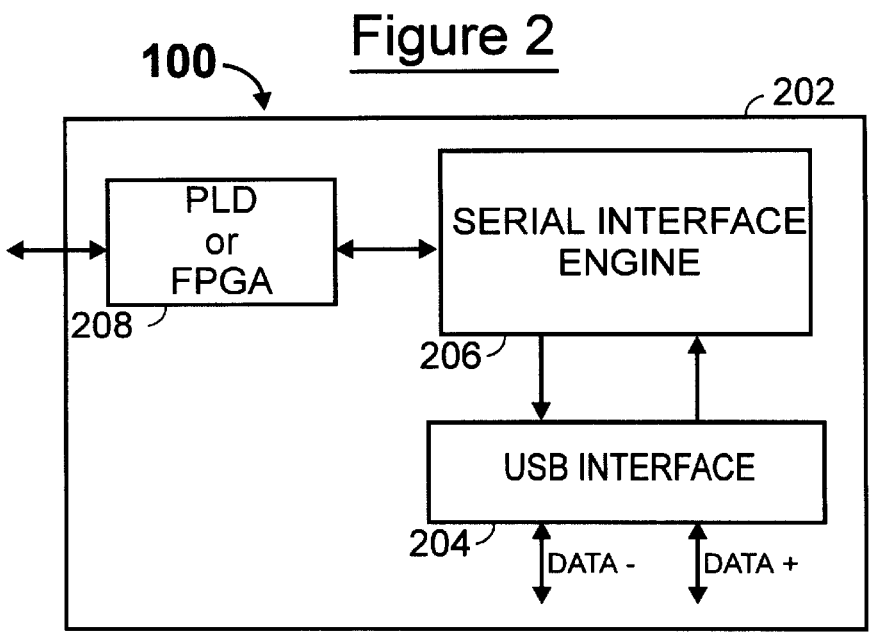
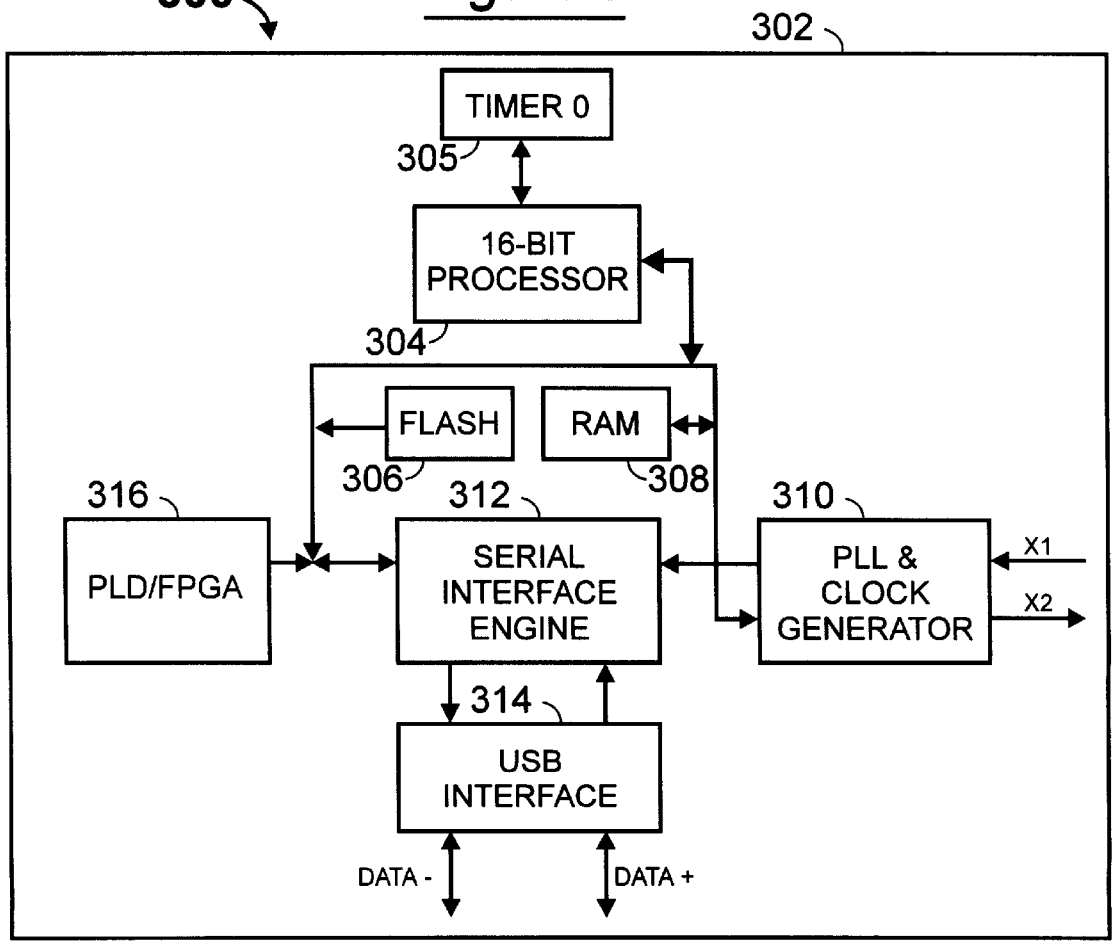

FUNCTION SIE INTERFACE

CONFIGURABLE UNIVERSAL SERIAL BUS (USB) CONTROLLER IMPLEMENTED ON A SINGLE INTEGRATED CIRCUIT (IC) CHIP WITH MEDIA ACCESS CONTROL (MAC)

CROSS-REFERENCE(S) TO RELATED APPLICATION(S)

This application is a continuation-in-part of commonly-owned, copending U.S. patent application Ser. No. 60/070,097 filed Dec. 31, 1997, incorporated in its entirety by reference herein.

This application is related to commonly-owned, U.S. patent application Ser. No. 08/970,992, (now U.S. Pat. No. 6,131,125), filed Nov. 14, 1997 on behalf of inventors Michael Rostoker and Joel Silverman, entitled PLUG-AND-PLAY DATA CABLE WITH PROTOCOL TRANSLATION, and is also related to commonly-owned, U.S. patent application Ser. No. 08/970,736, (now U.S. Pat. No. 6,128,673), filed Nov. 14, 1997 on behalf of inventors Michael Aronson and Joel Silverman, entitled METHOD AND APPARATUS FOR DIGITAL PROTOCOL TRANSLATION, both of which are incorporated in their entirety by reference herein by reference for all purposes.

TECHNICAL FIELD OF THE INVENTION

The present invention relates to digital communications and, more particularly, to effecting communications between devices operating with disparate protocols (e.g., USB, Ethernet, etc.).

BACKGROUND OF THE INVENTION

There is often a need or a desire to permit the digital electronic communication between two or more digital electronic devices and apparatus. For example, it is often desirable to have a personal computer interfaced with a local area network (LAN). To implement the digital electronic communication between the computer and the network, various communication protocols have been developed. For example, Ethernet is a common communication protocol used in many local area networks.

In practice, in order to network a personal computer, a network card is installed in the computer. Often, the network card includes an Ethernet port. A cable assembly, typically including Ethernet connectors at both ends, can be used to connect the Ethernet port of the network card into the network system.

A problem can sometimes arise when two or more apparatus are configured to communicate with different communication protocols. For example, laptop computers are not often provided with Ethernet cards, and therefore cannot directly communicate with Ethernet networks or other apparatus communicating using Ethernet protocols. One solution is to add a PCMCIA Ethernet card to the portable computer to allow its connection to an Ethernet network. However, standard PCMCIA Ethernet cards have considerable associated overhead from both a hardware and a software point of view. Further, the speed of the Ethernet connection is limited by the speed of the PCMCIA interface. External devices that add Ethernet capabilities to lap-tops undesirably add size and weight to the overall system.

This communication problem will be further explained with reference to FIGS. 1A–1C. In FIG. 1A, a first apparatus 10 is coupled to a second apparatus 12 by a cable assembly 14. Apparatus 10 can be, for example, a personal computer provided with a network card 16 having an Ethernet port (connector) 18. The apparatus 12 can be any number of other types of computer equipment including a network hub, a personal computer, a printer, etc., and is provided with its own network card 20 with Ethernet port (connector) 21. It should be noted that the circuitry of network cards 16 or 20 can be integrated into the electronics of the apparatus 10 or 12, respectively. For example, the circuitry of network card 16 can be provided on the mother board of a personal computer apparatus 10.

The cable assembly 14 includes a first connector 22, a second connector 24, and a cable 26 extending between the two connectors. Connector 22 engages with connector 18 of Ethernet card 16, and connector 24 engages with connector 21 of Ethernet card 20. Since both apparatus 10 and apparatus 12 are communicating with the same communication protocol, i.e. with an Ethernet protocol, a simple connection by cable assembly 14 suffices to place the two pieces of apparatus into digital electronic communication.

A problem arises when two apparatus attempt to communicate using two different communication protocols. For example, in FIG. 1B, it may be desirable to have a first apparatus 10 communicate with a second apparatus 12 which communicates by a different communication protocol. That is, the apparatus 10 might be provided with an Ethernet ported network card 16 while apparatus 12 might be provided with a serial communications (e.g. an RS-232) card 28. In such instances, a translator box 30 can be provided which communicates with an Ethernet communication protocol at a first port 32 and with a serial communication protocol at a second port 34. Devices including interface cards are examples of such translator boxes 30.

In FIG. 1C, a first apparatus 10 is coupled to a second apparatus 12 by a "smart" cable 36. In an example, the apparatus 10 has a card 38 communicating with a first communication protocol, and apparatus 12 has a card 40 communicating with a second communication protocol. However, instead of having a separate translator box 30 as explained with reference to FIG. 1B, the smart cable 36 of FIG. 1C includes embedded circuitry for translating the communication protocol of apparatus 10 into the communication protocol for apparatus 12. For example, apparatus 10 can be a personal computer having a USB card 38 and apparatus 12 can be a printer having a parallel or Centronics port 40. The smart cable 36 then translates the USB protocols of apparatus 10 into Centronics protocols of apparatus 12 and vice versa. The digital circuitry of the smart cable can be located within a connector 42 or a connector 44 of the cable or can be part of the cable 46, e.g. in the form of a dongle 48.

There are several examples of smart cables that are commercially available. For example, Methode New England provides smart cables with built-in termination, hot swap circuitry, and dongle integration. The Smart Cable Company of Tacoma, Wash. produces a FC819/825 smart serial to parallel cable which automatically adjusts itself for serial to parallel or parallel to serial conversion. Logic Control, Inc. markets the IW 2000 Intelligent Wedge Cable which converts RS232 or decoded TTL serial data to keyboard data. Also, B&B Electronics Manufacturing Company markets the model USBP10 cable which allows USB ports to be coupled to parallel printers.

The problem with the current generation of smart cables is that they are only available for a limited number of rather simple protocol conversions, and they are not easily upgradable. Also, many of these devices require software drivers to be loaded onto a host computer in order to operate properly.

Further, most of these devices require either a relatively large connector (such as Centronics connector), or a bulky dongle, to house the translation circuitry. This is because the translation circuitry as associated printed circuit (PC) board tends to be quite bulky.

In addition, even "smart" cables are not typically "plug-and-play". That is, typically drivers are required on the host computer to which the cable is attached to properly operate the smart cable. Therefore, the smart cables of the prior art tend not to be "transparent" from the user's point of view.

Glossary

Unless otherwise noted, or as may be evident from the context of their usage, any terms, abbreviations, acronyms or scientific symbols and notations used herein are to be given their ordinary meaning in the technical discipline to which the invention most nearly pertains. The following terms, abbreviations and acronyms may be used in the description contained herein:

| | |
|---|---|
| A/D: | Analog-to-Digital (converter). |
| ALU: | Arithmetic Logic Unit. |
| ASIC: | Application-Specific Integrated Circuit. |
| bit: | binary digit. |
| byte: | eight contiguous bits. |
| CAM: | Content-Addressable Memory. |
| CMOS: | Complementary Metal-Oxide Semiconductor. |
| CODEC: | Encoder/De-Coder. In hardware, a combination of A/D and D/A converters. In software, an algorithm pair. |
| CPU: | Central Processing Unit. |
| D/A: | Digital-to-Analog (converter). |
| DRAM: | Dynamic Random Access Memory |
| DSP: | Digital Signal Processing (or Processor) |
| EEPROM: | Also E2PROM. An electrically-erasable EPROM. |
| EPROM: | Erasable Programmable Read-Only Memory. |
| Flash: | Also known as Flash ROM. A form of EPROM based upon conventional UV EPROM technology but which is provided with a mechanism for electrically pre-charging selected sections of the capacitive storage array, thereby effectively "erasing" all capacitive storage cells to a known state. |
| FPGA: | Field-Programmable Gate Array |
| g: | or (giga), 1,000,000,000 |
| Gbyte: | gigabyte(s). |
| GPIO: | General Purpose Input/Output. |
| HDL: | Hardware Description Language. |
| IC: | Integrated Circuit. |
| I/O: | Input/Output. |
| IEEE: | Institute of Electrical and Electronics Engineers |
| JPEG: | Joint Photographic Experts Group |
| k: | (or kilo), 1000. |
| KHz: | KiloHertz (1,000 cycles per second). |
| MAC: | Media Access Control. |
| Mask ROM: | A form of ROM where the information pattern is "masked" onto memory at the time of manufacture. |
| MCM: | Multi-Chip Module. |
| memory: | hardware that stores information (data). |
| m: | (or mega), 1,000,000 |
| MHz: | MegaHertz (1,000,000 cycles per second). |
| MLT: | Multi-Level Technology. |
| NVRAM: | Non-volatile RAM. |
| PLL: | Phase Locked Loop |
| PROM: | Programmable Read-Only Memory. |
| PWM: | Pulse Width Modulation. |
| PLD: | Programmable Logic Device. |
| RAM: | Random-Access Memory. |
| RISC: | Reduced Instruction Set Computer (or Chip). |
| ROM: | Read-Only Memory. |
| SIE: | Serial Interface Engine. |
| software: | Instructions for a computer or CPU. |
| SRAM: | Static Random Access Memory. |
| UART: | Universal Asynchronous Receiver/Transmitter. |
| USB: | Universal Serial Bus. |
| UV EPROM: | An EPROM. Data stored therein can be erased by exposure to Ultraviolet (UV) light. |
| VHDL: | VHSIC (Very High Speed Integrated Circuit) HDL. |

BRIEF DESCRIPTION (SUMMARY) OF THE INVENTION

An object of the present invention is to provide an improved technique for effecting digital communications between digital devices and systems using different communication protocols.

According to the invention, a technique is provided for interfacing signals to and from devices employing disparate industry standard function. This technique is preferably implemented by combining an ASIC or other custom logic with, for example, a PLD/FPGA on a board, multichip module, or preferably on a single integrated circuit device. For a fixed-function portion, ASIC technology is suitably efficiently. PLD/FPGA technology is suitably employed for portions of the design that need to be re-configured, due to the ease and low cost of modifying their function(s). Alternatively, SRAM or Flash may be substituted for the PLD/FPGA portion.

In a preferred embodiment of the invention, a single integrated circuit (IC) chip combines fixed function(s) and standard interfaces to handle the main portion of the design, and a PLD (or equivalent) section for the user to program for their specific protocol or other implementation. Preferably, the IC chip contains both RAM and ROM, and is implemented in Flash. Optionally, the IC chip is also provided with a full ASIC option so that the design can readily be converted from gate array type to a fully-masked, cell-based or full-custom version.

An exemplary use for the IC chip of the present invention is to simplify the development of a USB-to-Ethernet function. The IC chip can be used in a Dongle-type of application, as well as mounted to a small printed circuit board (PCB). Such an approach can readily be adapted to other interfaces such as the IEEE 1394 (firewall), as well as other networking types of approaches, such as token ring or higher speed Ethernet adapters.

An integrated circuit (IC) employing the techniques of the present invention may be included in a system or subsystem having electrical functionality. Example systems may include general purpose computers; telecommunications devices (i.e., phones, faxes, etc.); networks; consumer devices; audio and visual receiving, recording and display devices; vehicle; etc.. It is within the scope of the invention that such systems would benefit substantially from technique (s) of the present invention.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawings. The drawings are intended to be illustrative, not limiting. Although the invention will be described in the context of these preferred embodiments, it should be understood that it is not intended to limit the spirit and scope of the invention to these particular embodiments. Certain elements in selected ones of the drawings are illustrated not-to-scale, for illustrative clarity. Often, similar elements throughout the drawings are referred to by similar references numerals. For example, the element 199 may be similar in many respects to the element 299 in another figure. Also, often, similar elements are referred to with similar numbers in a single drawing. For example, a plurality of elements 199 may be referred to as 199a, 199b, 199c, etc.

FIG. 2 is a block diagram of a single chip USB controller, according to the invention.

FIG. 3 is a block diagram of a single chip USB controller, according to the invention.

DETAILED DESCRIPTION OF THE INVENTION

Figure 1A:
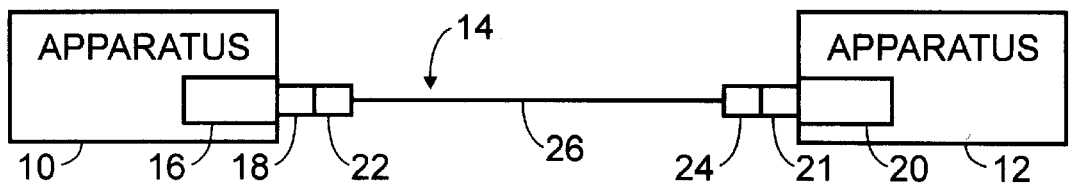
FIGS. 1A–1C are pictorial illustrations used in a discussion of the prior art.
Figure 1B:
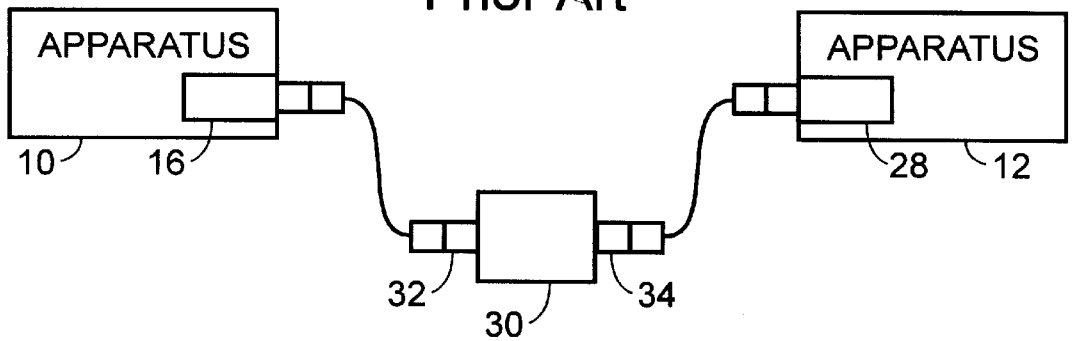
Figure 1C:
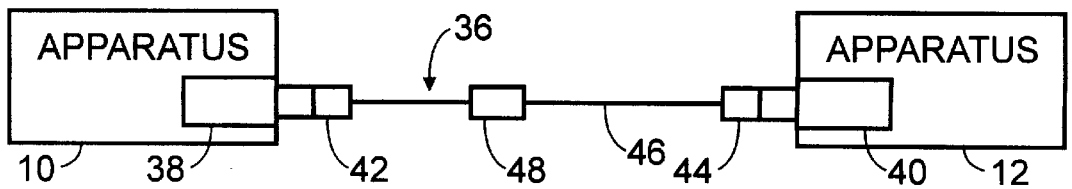

A broad description of the prior art has been set forth hereinabove.

A large number of designs need to be implemented for standard interfaces such as the USB or IEEE 1394. Since the interface specifications are constantly evolving, it is often time-consuming and expensive for an end user to keep up with the various technology changes. The result is effort expended by the user in an area that is often not within their area of expertise.

As an alterative, PLD/FPGA, or another user-programmable IC offers the end user bulk programmability, but with limited flexibility. It would not, however, be able to provide a high-level, cost-effective solution. Alternatively, an application specific integrated circuit (ASIC) offers the best utilization in terms of cost-effectiveness for the final product but usually involves several design turns as the specifications evolve, thereby increasing cost substantially.

Therefore, according to a first aspect of the invention, a technique is provided for combining one or more industry standard function(s) along with a user-programmable section. This can be achieved by the combination of an ASIC or other custom logic with, for example, a PLD/FPGA on a board, multichip module, or preferably on a single integrated circuit device. For the fixed function portion, ASIC technology is used to efficiently implement the circuit. The PLD/FPGA is used for portions of the design that are changing due to the ease and low cost of modifying their function(s). Alternatively, SRAM or Flash may be substituted for the PLD/FPGA portion.

In a preferred embodiment of the invention, a single chip IC device combines fixed function(s) and standard interfaces to handle the main portion of the design, and a PLD (or equivalent) section for the user to program for their specific protocol or other implementation. Preferably, the single chip IC device contains both RAM and ROM, and is implemented in Flash. Optionally, the single chip IC device is also provided with a full ASIC option so that the design can readily be converted from gate array type to a fully-masked, cell-based or full-custom version.

FIG. 2 illustrates a first preferred embodiment 200 of a simple, configurable, single-chip USB controller IC 202 for providing the capability to interface a peripheral device (not shown) to the universal serial bus (USB). Alternative protocol matching is possible, as described in greater detail hereinbelow. The USB controller 202 comprises a USB transceiver 204, a serial interface engine (SIE) 206, and user-programmable section 208, all interconnected as shown. The user-programmable section 208 has a variety of gate count options (for example, 5k gates of PLD or FPGA) that can be configured by the user to virtually any USB requirement. The user-programmable (e.g., FPGA) portion 208 is readily programmed with standard tools, and facilitates fast design cycles.

FIG. 3 illustrates another embodiment of a configurable, single-chip USB device 302 capable of interfacing a peripheral device to the Universal Serial Bus (USB). In this embodiment, the USB controller comprises a 16-bit (e.g.) central processor 304 run by a timer (TIMER 0) 305, Flash memory 306, RAM 308, a phase lock loop (PLL) and clock generator 310, a serial interface engine (SIE) 312 (compare 206), a USB interface 314 (compare 204), and a user-programmable logic section 316 (compare 208, 208a), all interconnected as shown to provide control and data access, and USB data reception and transmission. The user's logic function is implemented in the user-programmable logic (e.g., FPGA) section 316, and the user's program (software instructions for running the processor 304) is stored in the Flash memory 306. This generates ASIC-type functionality with the ease and speed of FPGA's. It is within the scope of this invention that Mask ROM, UV EPROM, or other suitable storage medium be substituted for the Flash memory 306.

Figure 4:
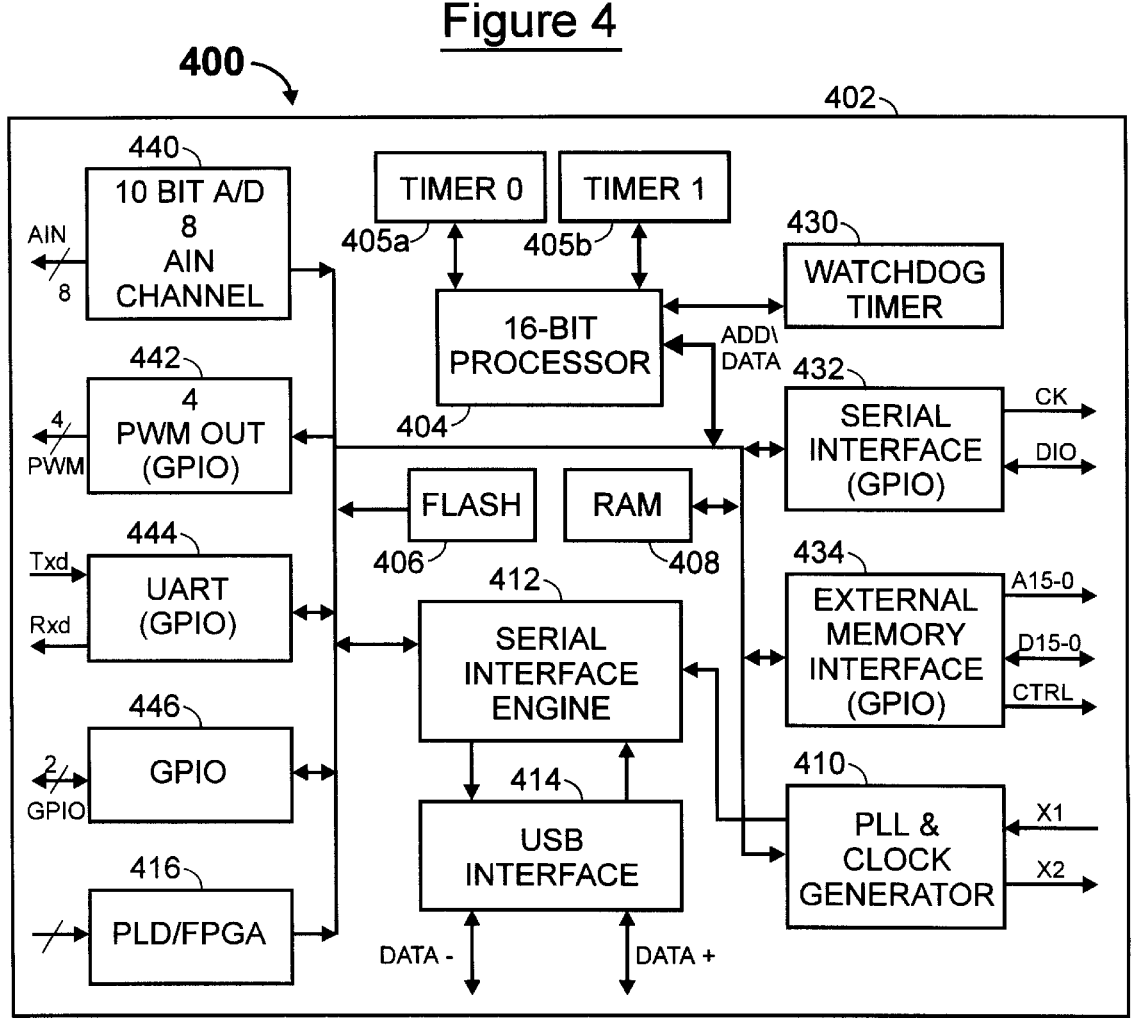
FIG. 4 is a block diagram of a single chip USB controller, according to the invention.

FIG. 4 illustrates another embodiment of a configurable, single-chip USB device 402 capable of interfacing a peripheral device to the Universal Serial Bus (USB). As in the previous embodiment 300, the USB controller comprises a 16-bit (e.g.) central processor 404 (compare 304) run by two timers (TIMER 0 and TIMER 1) 405a and 405b (compare 305), flash memory 406 (compare 306), RAM 408 (compare 308), a phase lock loop (PLL) and clock generator 410 (compare 310), a serial interface engine (SIE) 412 (compare 312), a USB interface 414 (compare 314), and a user-programmable logic section 416 (compare 316), all interconnected as shown to provide control and data access, and USB data reception and transmission. As in the previous embodiment 300, in this embodiment 400 the user's logic function is implemented in the user-programmable logic (e.g., FPGA) section 416, and the user's program (software instructions for running the processor 404) is stored in the Flash memory 406. This generates ASIC-type functionality with the ease and speed of FPGA's. It is within the scope of this invention that Mask ROM be substituted for the Flash memory 406.

The processor 414 (see also 314) is suitably a 16-bit processor which, along with a suitable memory 406 for storing instructions (code), is capable of executing a specialized instruction set which is designed for highly efficient coding of processing algorithms and USB transaction processing. The processor 414 has access to a RAM buffer 408, external memory interface 434, and all the appropriate control and status registers (not shown).

The RAM buffer 408 (see also 308) is suitably a 3 kilobyte internal buffer memory, organized as 1.5K×16. This memory 408 is used to buffer data and USB packets, and is accessed by the processor 404 and the SIE 412. USB transactions are automatically routed to the memory buffer 408. The processor 404 sets up pointers and block sizes in the buffer memory 408 for the USB transactions. Data is read from the USB interface 414, and is processed and packetized by the I/O processor 404. The I/O processor is suitably 16-bit.

The PLL & Clock Generator 410 (see also 310) has two lines (pins) exiting the chip 402, which are labeled "X1" and "X2". These lines are suitably connected to an external crystal-controlled circuit (not shown). In this manner, the PLL circuitry 410 generates the internal clock requirements of the device, for example, at 48 MHz. If an external clock (e.g., 12 MHz) is available, it may be used in lieu of the crystal circuit by connecting directly to the X1 pin.

In this embodiment 400, additional functionality is provided by the following sections, connected as shown:

The USB controller 402 has a built-in transceiver which meets the current (e.g., v1.0) Universal Serial Bus (USB) specification. the transceiver is capable of transmitting and receiving serial data at the USB full speed, e.g., 12 Mbits/sec, data rate. The driver portion of the transceiver is preferably differential, and the receiver portion preferably comprises a differential receiver and two single-ended receivers. Internally, the transceiver interfaces to the SIE 412 logic. Externally, the transceiver connects to the physical layer of the USB.

An analog-to-digital (A/D) interface 440 is provided which may, for example, be a 10-bit A/D converter with eight analog inputs, and be capable of converting data at the rate of 100K samples per second.

A pulse width modulation (PWM) interface (output channel) 442 is provided which may, for example, have four channels, each of the four channels capable of converting 10 bits at up to 48 KHz.

A Universal Asynchronous Receive/Transmit (UART) circuit 444 is provided which may, for example, be capable of supporting 7200 to 115.2K baud.

A General Purpose I/O (GPIO) circuit 446 is provided which may, for example, be capable of providing up to 32 general purpose I/O signals for use off-chip. The GPIO 446 may be configured for special-purpose functions such as UART, Serial EEPROM interface, digital input, and the like.

A serial interface circuit 432 is provided which may, for example, be used to provide access to external devices such as serial EEPROMs or other serially controllable devices. This interface is suitably implemented using General Purpose I/O signals and can support a variety of serial EEPROM formats.

A RAM/DRAM interface circuit 434 is provided which may, for example, be used to interface the controller 402 to external RAM or DRAM. A port from this interface circuit suitably provides RAS, CAS, RD and WR control signals for data access and refresh cycles to DRAM.

A watchdog timer circuit 430 helps to guarantee system integrity by issuing a reset signal to the processor 404, if the processor ever fails to reset the watchdog timer ("kick the dog") before it times out. Typically, a program running on the 16-bit processor sets a timeout interval in the watchdog timer and schedules periodic resets of the watchdog on shorter time intervals. This practice makes the assumption that if the processor ever fails to reset the watchdog timer before the timeout interval has expired, then it must have become "locked up" or some other system failure must have occurred.

The processor 404 is responsive to special purpose instructions stored in memory 406 for USB transaction processing and control data processing. In this manner, a complete USB interface is provided with built-in transceivers and SIE (Serial Interface Engine) 412, internal clock generation circuitry 410 which requires only low cost external crystal circuitry (not shown), an internal RAM buffer 408 (for example, 15K×16), built-in analog/digital conversion 440 (for example, 10-bit), pulse width modulation (PWM) 442 output support, built in UART 444, and a watchdog timer 430.

In this manner, a communications/interface subsystem can be integrated on a single integrated circuit (IC) die (chip), and can be configured to interface non-USB standards (such as IEEE 1394, ATM, Ethernet) as well as USB standards (e.g., USB v1.0).

Media Access Control (MAC) Embodiments

Portable computing systems, such as laptop computers, mobile and personal digital assistant (PDA) types of devices, including digital cameras, audio and video equipment, storage devices, and the like, are increasingly being networked with one another, using various interfaces, with a varying degree of success. Standard PCMCIA Ethernet cards, for example, have a great deal of associated overhead, from a hardware and software point of view. IrDA connections are limited by line of sight, and are not easily used for this type of connection. Other external devices add a great deal of size and weight to the portable system.

What is needed is a small device to interface between portable computing systems, and to connect portable computing systems to networks. As described in greater detail hereinbelow with respect to FIG. 5 et seq., the present invention addresses this need with a single integrated circuit (IC). In the description that follows, the example of interfacing a USB and a MAC interface is illustrative of interfacing any two dissimilar protocols.

The overall purpose of such a single IC chip having this interface capability is to simplify the development of a USB-to-Ethernet function. The IC chip can be used in a Dongle-type of application, as well as mounted to a small printed circuit board (PCB), as described hereinbelow with respect to FIGS. 8A and 8B. Such an approach can readily be adapted to other interfaces such as the IEEE 1394 (firewall), as well as other networking types of approaches, such as token ring or higher speed Ethernet adapters.

Figure 5:
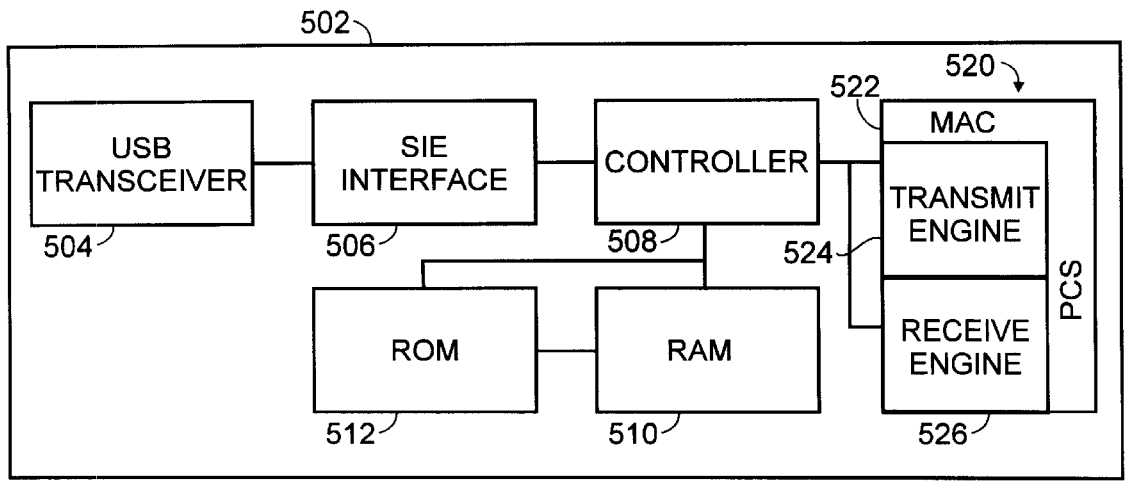
FIG. 5 is a block diagram of an Ethernet controller, according to the invention.

FIG. 5 illustrates a general control device 500 (Ethernet controller) that combines a USB interface with a MAC unit, preferably on a single integrated circuit (IC) chip 502, according to the invention.

The IC chip 502 provides an easy-to-use interface between USB and Ethernet (e.g., 802.3) protocols. The IC chip 502 comprises a USB transceiver functional block 504, a serial interface engine (SIE) functional block 506, a micro-controller functional block 508 having internal RAM 510 and ROM 512, an Ethernet MAC (e.g., 10 Mhz) functional block 514, and other functional blocks (not shown) to control and integrate the aforementioned functional blocks 504–514.

In an exemplary embodiment of the Ethernet controller 500, the controller is a high-speed microprocessor, DMA transfers are supported, there are 3 KB of RAM, there are 8 KB of ROM. Minimal external components are required, and a "glue-less" interface to PHY and memory is facilitated.

Optional features include a serial EPROM interface (e.g., 12C), and a memory controller capable of interfacing to external SRAM, DRAM and ROM should additional memory be required beyond what is already on-chip.

The USB functionality of such a controller 500 is 12 M bits/second transfer rate, guaranteed service latency, guaranteed bandwidth allocation, and built-in error detection and recovery.

The Ethernet functionality of such a controller is full-duplex operation and conformance to the Ethernet 802.3 specification.

As far as software is concerned, the controller 500 can operate with standard Win95-type drivers. NDIS drivers are also readily supported.

The controller 500 can be fabricated using standard 3.3 volt, 0.5 micron CMOS technology, utilizes low power, and can be housed in a 100 pin quad flat pack (QFP) package.

Figure 6:
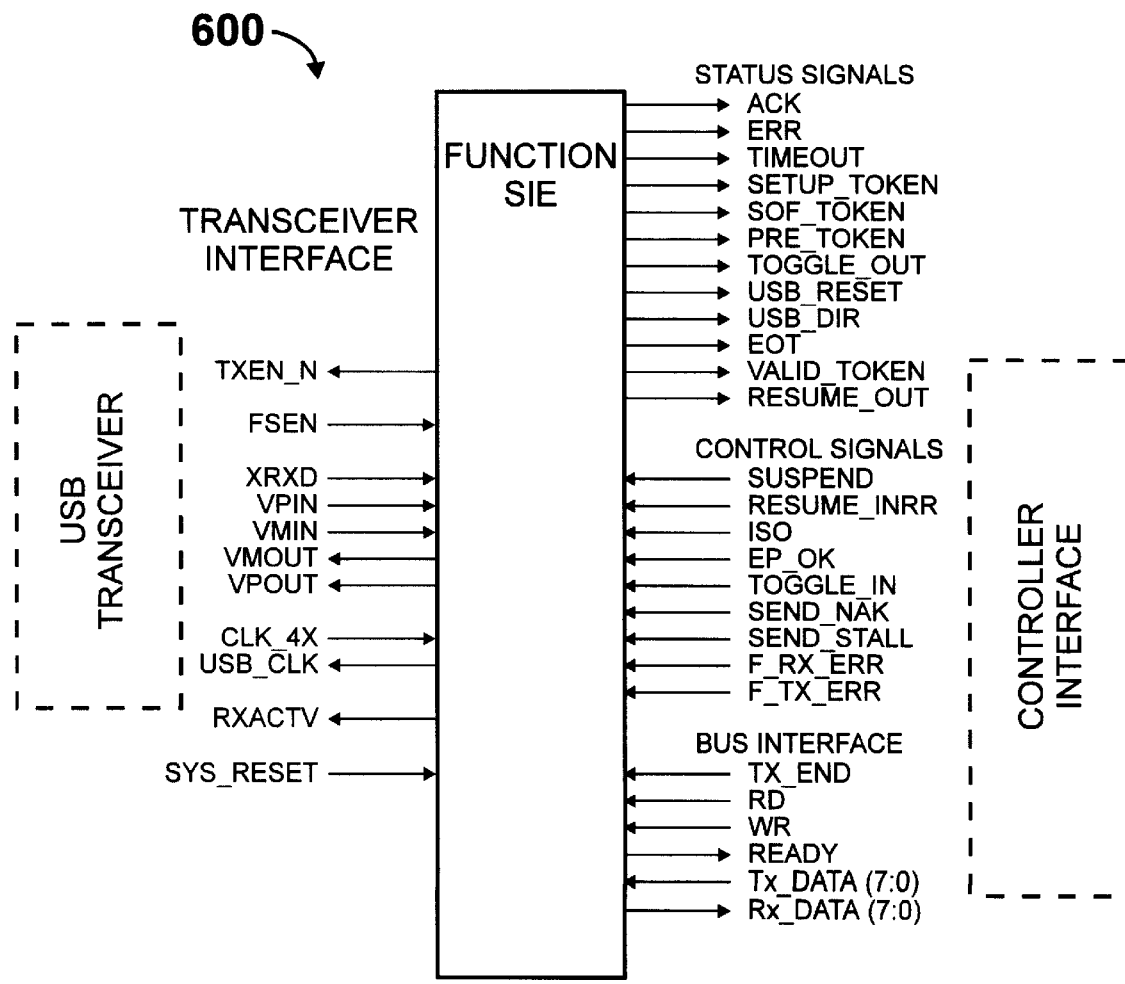
FIG. 6 is a block diagram of a Function SIE interface, according to the invention.

FIG. 6 illustrates the primary interconnections between the USB transceiver 504 and controller interface 520 of FIG. 5.

The USB function SIE interface specification describes the interfacing signals between the USB function SIE reference VHDL design (referred to as "Function SIE") and the surrounding USB function interface logic. The function SIE utilizes a slave-oriented eight-bit bus interface. Interface signals are divided into four groups:

Status: These signals provide output information regarding the results of the last attempted USB transaction.

Control: These signals are function inputs to the SIE to control the state transitions of the SIE state machine based on the following variables:
Valid address/endpoint values;
Availability of buffer space or data
Error conditions Bus Interface: These are interface signals to access data to/from the SIE.

Transceiver Interface: These are interface signals for connecting the SIE to a USB-compatible differential transceiver.

The term "Host" refers to the hardware/software to which the SIE is connected to in the Function. The USB Host is referred to as "USB Host".

Ethernet MAC

The Ethernet MAC (Media Access Control) logic supports the standard IEEE 802.3 specification for 10 MB. The MAC supports full duplex operation at 10M bit data rates.

PHY Interface

The PHY interface implements the Physical Coding Sublayer (PCS) function, allowing for a glue-less interface to a Twisted Pair-Physical Medium Dependent (TP-PMD) PHY with a Manchester ENDEC (encoder decoder). Both full and half duplex operational modes are supported.

Configuration options including CRC generation, padding of small packets to minimum pack size, and transmission of giant (>1518 byte) packets.

Status reporting including CRC errors, excessive collision, late collision, transmit FIFO underrun, receive FIFO overrun, and transmitted and received byte counts.

Built-in jabber protection and loss of carrier and SQE (Signal Quality error) detection are also provided.

Memory Interface

8 KB of mask ROM and 3 KB of SRAM are provided. While this is sufficient for many applications, additional external memory can easily be added.

DRAM

The chip contains an integrated DRAM controller, and provides a glue-less interface to standard DRAM chips.

An SRAM interface is provided.

A ROM interface is provided.

An I$^2$C Interface facilitates the interconnection to serial EPROM devices. The EPROM can be used to store serial numbers, manufacturer's ID, and other product code information.

Software Drivers

Networking support is provided via a NDIS 4.0 intermediate mini-driver. This NDIS intermediate mini-driver dynamically connects to a USB driver for data support. If the USB driver is not available (i.e., the USB device is not connected or is disabled), the NDIS driver will return a status of NOT_AVAILABLE. This behavior allows the user to disconnect and reconnect their USB Ethernet without reinstalling their NDIS drivers and re-booting. Additionally, drivers for the following operating systems are available:

Windows NT 5.0;
Windows 95 OSR 2.1; and
Windows 98.

Figure 7:
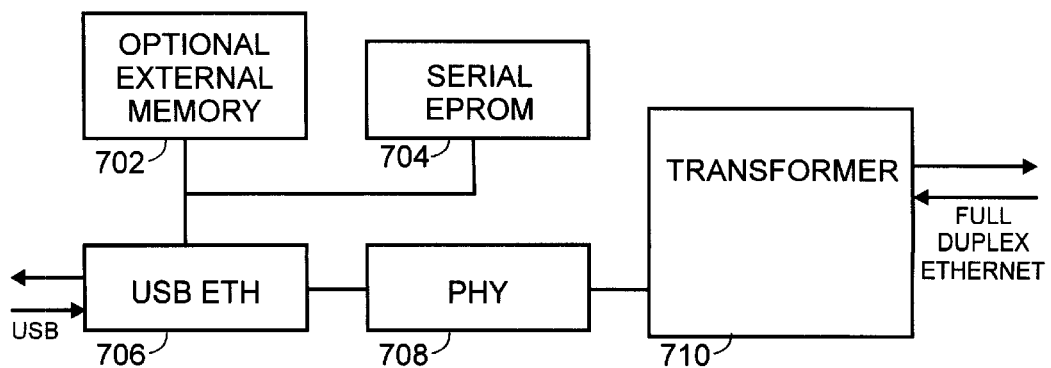
FIG. 7 is a block diagram of a typical application for the present invention.

FIG. 7 illustrates a typical system 700 employing the general control device 500 of FIG. 5.

Preferably, the physical interface (PHY) would also be included the IC chip 502 to facilitate integration of the device into a cable. In such a case, the cable itself could become the Ethernet adapter. Using the Plug-and-Play capability of USB, such a cable could readily be attached and removed whenever the Ethernet was required, without requiring re-booting the machine to which the cable is attached.

Figure 8A:
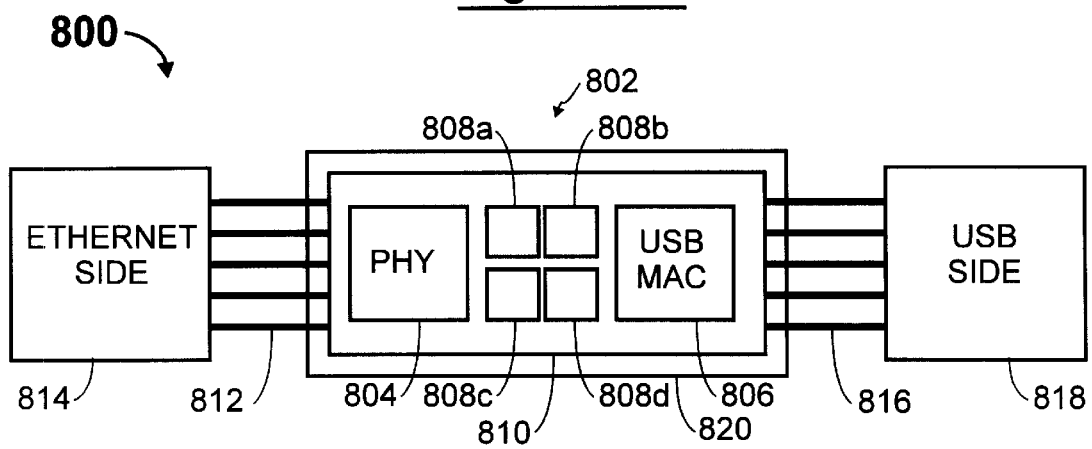
FIGS. 8A and 8B are top and side views, respectively, of a "smart" cable, according to the invention.
Figure 8B:
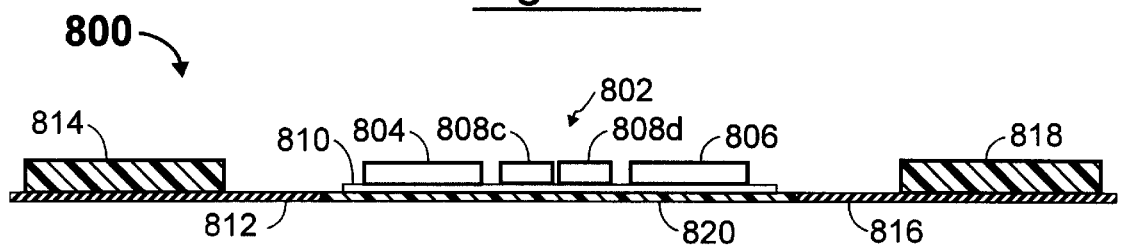

As illustrated in FIGS. 8A and 8B, all of the components of the system 700 can be integrated into a single "smart" USB-to-Ethernet translation cable 800.

"Smart" Cable Embodiment

Translation circuitry, such as has been described hereinabove, can be utilized in a "smart" cable to interface two devices employing two different communications protocols. In the discussion of an exemplary smart cable that follows, interfacing two devices, one of which employs an Ethernet protocol, the other of which employs USB protocol are described.

FIGS. 8A and 8B illustrate, in top and side views, respectively, a cable 800 having translation circuitry 802. The translation circuitry 802 comprises a physical interface (PHY) chip 804, a USB MAC 806, and a number of other chip, surface mount or small devices 808a, 808b, 808c and 808d as may be required. These components 804, 806, 808a . . . 808d are disposed on an interconnection substrate 810, such as a printed circuit board (PCB), having conductive traces which interconnects the various components.

A first set of conductive (metallic) fingers 812 extend from a first end of the circuit board 810 to a first plastic connector 814, and a second set of conductive (metallic) fingers 816 extend from another (preferably opposite) end of the circuit board 810 to a second plastic connector 818.

The first plastic connector 814 connects to a first external device (not shown) employing a first (e.g., Ethernet) protocol, and the second plastic connector 818 connects to a second external device (not shown) employing a second (e.g., USB) communications protocol. USB "keyed" connectors are configured in two "series": "Series A" receptacles and plugs which are always oriented upstream towards the host system, and "Series B" receptacles and plugs which are always oriented downstream towards the USB device.

As best viewed in the side view of FIG. 8B, the circuit board 810 may be supported on a support substrate 820 made of an insulating material such as plastic for the connectors. The various components 804, 806, 808a . . . 808d, 810 and 820 are preferably made with as small of a form factor as possible to permit the translation circuitry to be enclosed within one of the end connectors of the cable assembly.

Figure 9:
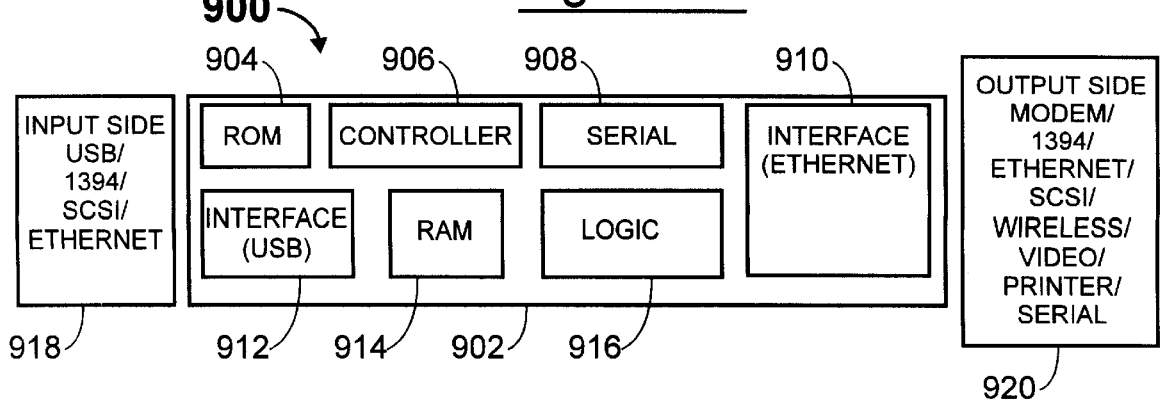
FIG. 9 is a generalized block diagram of an interface converter, according to the invention.

FIG. 9 is a block diagram of a generalized interface converter 900, according to the invention. An "engine" or controller portion 902 of the interface converter 900 comprises a ROM 904, a controller 906, a serial interface controller 908, an output side interface 910, an input side interface 912, RAM 914, and logic 916. The ROM 904 can be a Flash memory, masked ROM, UV erasable PROM, or other suitable storage device, and is intended to act primarily as program and data storage for the controller 906. The RAM can be static RAM, dynamic RAM, or other suitable "scratchpad" storage memory device for use by the controller 906. The logic 916 is configured to interface the other components of the engine 902 (i.e., ROM 904, serial interface 908, output side interface 910, input side interface 912, RAM 914) to the controller 906.

Although shown preferably as a USB interface, the input side interface 912 can also be implemented as an IEEE 1394 Parallel interface, a SCSI interface, or an Ethernet interface. An input side connector 918, interfaces external equipment to the interface 912.

Although shown preferably as an Ethernet interface, the output side interface 910 can also be implemented as a modem, and IEEE 1394 parallel interface, a SCSI interface, an IrDA or radio wireless interface, a video interface or a printer or serial interface. An output side connector 920 interfaces external equipment to the interface 910. Optionally, memory, or other blocks can be added, depending on the configuration.

System Integration

It is clearly contemplated that the technique(s) of the present invention, as disclosed hereinabove, can be integrated with other electronic components and subsystems to realize a subsystem or a system having electrical functionality such as, but not limited to: general-purpose computers; telecommunication devices (e.g., phones, faxes, etc); networks; consumer devices; audio and visual (video) receiving, recording and display devices and systems; and vehicles such as planes, trains and automobiles.

Figure 10:
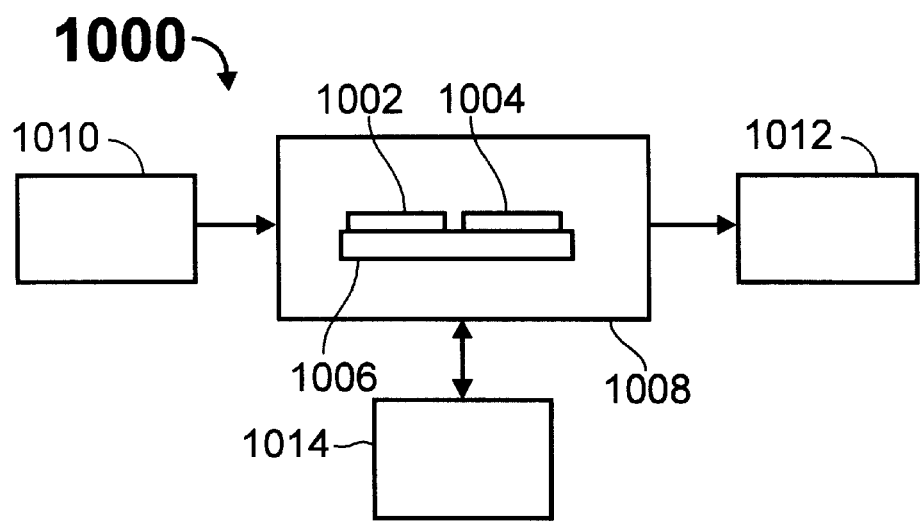
FIG. 10 is a schematic block diagram of a system incorporating the technique(s) of the present invention.

FIG. 10 illustrates an example of such an overall system 1000. As shown therein, an electronic component 1002 incorporating the technique(s) of the present invention can be connected, along with at least one other electronic component 1004, on an interconnection substrate (e.g., motherboard) 1006, thereby forming a subsystem 1008, to which a number of peripheral (e.g., external) devices may be connected. Exemplary peripheral devices may include:

- one or more devices 1010 for providing inputs to the subsystem 1008, such as keyboards, pointing devices, digitizing tablets, and the like;
- one or more devices 1012 for receiving outputs from the subsystem 1008, such as video monitors, and the like; and
- one or more devices 1014 for engaging in two-way communications with the subsystem 1008, such as modems, printers, and the like.

It is clearly within the purview of a person having ordinary skill in the art to which the present invention most nearly pertains to effect such system integration, based on the descriptions set forth hereinabove.

Figure 10A:
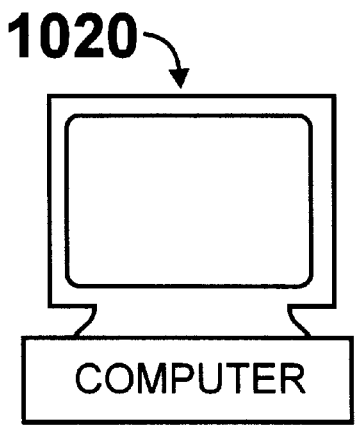
FIG. 10A is an illustration of a general purpose computer incorporating the technique(s) of the present invention.

FIG. 10A illustrates, for example, a general purpose computer 1020 (compare 1000) incorporating the present invention.

Figure 10B:
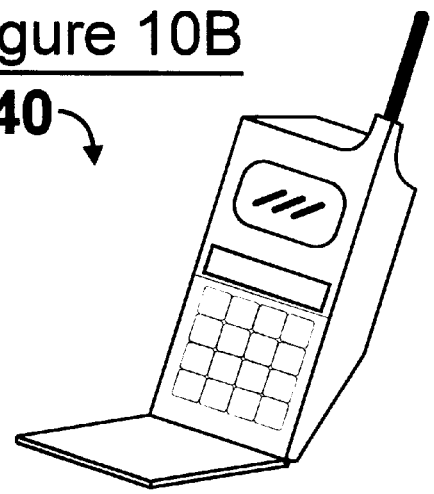
FIG. 10B is an illustration of a wireless telephone (cell phone) incorporating the technique(s) of the present invention.

FIG. 10B illustrates, for example, a wireless telephone 1040 (compare 1000) incorporating the present invention.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A universal serial bus (USB) controller implemented on a single integrated circuit (IC) chip, for interfacing to peripheral devices with alternative protocol matching, comprising:
   a USB transceiver;
   a serial interface engine (SIE) in communication with the USB transceiver; and
   a user-programmable section in communication over a connection with the SIE and programmable by the user with standard tools.

2. A universal serial bus (USB) controller, according to claim 1, wherein:
   the user-programmable section comprises programmable logic devices (PLD).

3. A universal serial bus (USB) controller, according to claim 1, wherein:
   the user-programmable section comprises a field-programmable gate array (FPGA).

4. A universal serial bus (USB) controller, according to claim 1, wherein:
   the user-programmable section comprises 5K gates.

5. A universal serial bus (USB) controller, according to claim 1, further comprising:
   a phase lock loop (PLL) and clock generator operatively connected with the serial interface engine (SIE);
   a processor section operatively connected with the serial interface engine, with the user-programmable section, and with the phase lock loop (PLL) and clock generator;
   read-only memory (ROM) for storing a user's software instructions for running the processor; and
   random access memory (RAM) operatively connected to the processor.

6. A universal serial bus (USB) controller, according to claim 5, wherein:
   the read-only memory (ROM) is selected from the group consisting of Flash memory and Mask ROM.

7. An electronic system incorporating at least one integrated circuit (IC chip), said IC chip comprising:
   a USB transceiver;
   a serial interface engine (SIE) in communication with the USB transceiver; and
   a user-programmable section in communication over a connection with the SIE and programmable by the user with standard tools.

8. An electronic system, according to claim 7, wherein:
the user-programmable section comprises programmable logic devices (PLD).

9. An electronic system, according to claim 7, wherein:
the user-programmable section comprises a field-programmable gate array (FPGA).

10. An electronic system, according to claim 7, wherein:
the user-programmable section comprises 5K gates.

11. An electronic system, according to claim 7, further comprising:
a phase lock loop (PLL) and clock generator operatively connected with the serial interface engine (SIE);
a processor section operatively connected with the serial interface engine, with the user-programmable section, and with the phase lock loop (PLL) and clock generator;
read-only memory (ROM) for storing a user's software instructions for running the processor; and
random access memory (RAM) operatively connected to the processor.

12. An electronic system, according to claim 11, wherein:
the read-only memory (ROM) is selected from the group consisting of Flash memory and Mask ROM.

13. An electronic system, according to claim 7, wherein the electronic system is selected from the group consisting of general-purpose computer, telecommunication device, network device, consumer device, receiver, recorder, display device, and vehicle.

14. A universal serial bus (USB) controller for interfacing to peripheral devices with alternative protocol matching, comprising:
a USB transceiver;
a serial interface engine (SIE) in communication with the USB transceiver;
a user-programmable section in communication over a connection with the SIE and programmable by the user with standard tools; and
read-only memory (ROM) in communication with the user-programmable section,
wherein the USB controller is implemented either on a single board, multichip module, or a single integrated circuit (IC) chip.

15. A universal serial bus (USB) controller, according to claim 14, wherein the user-programmable section comprises one of programmable logic device (PLD) and a field-programmable gate array (FPGA).

16. A universal serial bus (USB) controller, according to claim 14, further comprising:
a processor section operatively connected with the serial interface engine.

17. A universal serial bus (USB) controller, according to claim 14, further comprising:
a general purpose I/O (GPIO) circuit.

18. An electronic system, according to claim 7, wherein said IC chip further comprises:
a general purpose I/O (GPIO) circuit.

19. A universal serial bus (USB) controller, according to claim 1, further comprising:
read-only memory (ROM) in communication with the user-programmable section.

20. A universal serial bus (USB) controller, according to claim 19, wherein the user-programmable section comprises one of programmable logic device (PLD) and a field-programmable gate array (FPGA).

21. A universal serial bus (USB) controller, according to claim 19, further comprising:
a processor section operatively connected with the serial interface engine.

22. A universal serial bus (USB) controller, according to claim 1, further comprising:
a general purpose I/O (GPIO) circuit.

23. A universal serial bus (USB) controller, according to claim 14, further comprising:
a processor in communication over a second connection with the SIE and the user-programmable section.

24. A universal serial bus (USB) controller, according to claim 23, wherein:
the second connection comprises a bus shared with other components.

25. A universal serial bus (USB) controller, according to claim 14, wherein:
the connection comprises a dedicated connection.

26. A universal serial bus (USB) controller, according to claim 14, wherein:
the connection comprises a bus shared with other components.

27. An electronic system, according to claim 7, wherein:
the connection comprises a dedicated connection.

28. An electronic system, according to claim 7, wherein:
the connection comprises a bus shared with other components.

29. A universal serial bus (USB) controller, according to claim 1, further comprising:
a processor in communication over a second connection with the SIE and the user-programmable section.

30. A universal serial bus (USB) controller, according to claim 29, wherein:
the second connection comprises a bus shared with other components.

31. A universal serial bus (USB) controller, according to claim 1, wherein:
the connection comprises a dedicated connection.

32. A universal serial bus (USB) controller, according to claim 1, wherein:
the connection comprises a bus shared with other components.

* * * * *